United States Patent
Ducote

[15] 3,640,577
[45] Feb. 8, 1972

[54] RETRACTABLE MUD FLAPS FOR DUMP TRUCKS AND TRAILERS

[72] Inventor: Nolan J. Ducote, 306 Keller Street, Bunkie, La. 71322

[22] Filed: Apr. 20, 1970

[21] Appl. No.: 29,958

[52] U.S. Cl. .................................... 298/1 SG, 280/154.5
[51] Int. Cl. .................................................... B62b 9/16
[58] Field of Search .......................... 298/1 SG; 280/154.5

[56] References Cited
UNITED STATES PATENTS

| 2,653,846 | 9/1953 | Wiley | 298/1 SG |
| 2,872,211 | 2/1959 | Barrett | 280/154.5 |
| 3,401,953 | 9/1968 | Prohl | 280/154.5 |
| 3,165,360 | 1/1965 | Saxton | 298/1 SG |

*Primary Examiner*—Richard J. Johnson

[57] ABSTRACT

Dump trucks are provided mud flaps and means automatically activated by shifting of the load bed to move the flaps out of the way while dumping and to restore the flaps to normal position after dumping is completed.

4 Claims, 3 Drawing Figures

PATENTED FEB 8 1972　　　　　　　　　　　　　　　　3,640,577

INVENTOR.
NOLAN J. DUCOTE

RETRACTABLE MUD FLAPS FOR DUMP TRUCKS AND TRAILERS

SUMMARY OF THE INVENTION

Operators are required by law to have mud flaps secured to dump trucks and to maintain same secured at all times. However, present flaps are lowered to the ground as the bed is tilted to dump whereby the load is dumped partially on the flaps. As the bed is raised the flaps are placed under great strain and are soon jerked off and must be replaced.

In my invention the flaps are moved automatically out and away from the load when dumping begins and are automatically returned to normal position when dumping is completed. As a result, wear and tear on the flaps is minimized and the operating life of the flaps is sharply extended.

In my invention, the flaps are operated by springs under the control of a mechanism which is locked when the bed is in normal position and is unlocked when the bed is slightly tilted prior to being completely tilted for dumping. When the mechanism is locked it applies tension to the springs which pull the flaps into normal position. When the mechanism is unlocked, the tension is removed and the springs force the flaps out and away from the load as previously described.

DETAILED DESCRIPTION OF PREFERRED EMBODIMENTS

Figure 1:
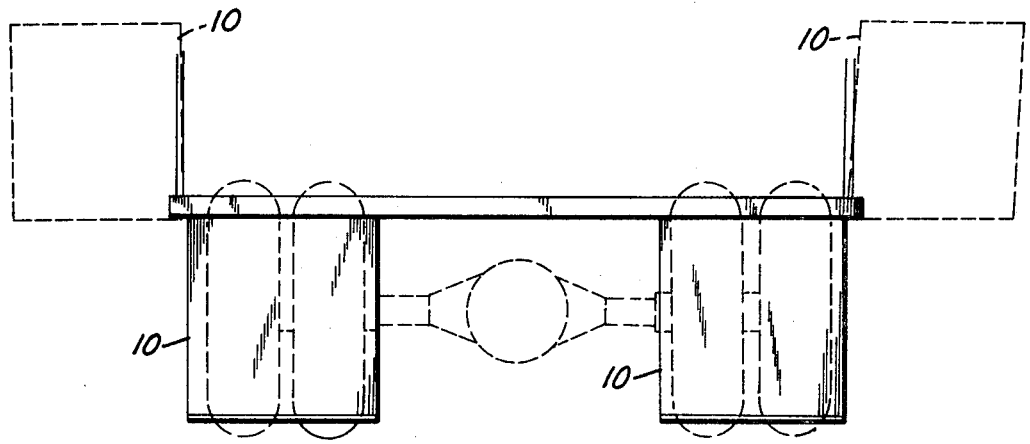
FIG. 1 is an end view of a dump truck showing the mud flaps in normal and raised positions.
Figure 2:
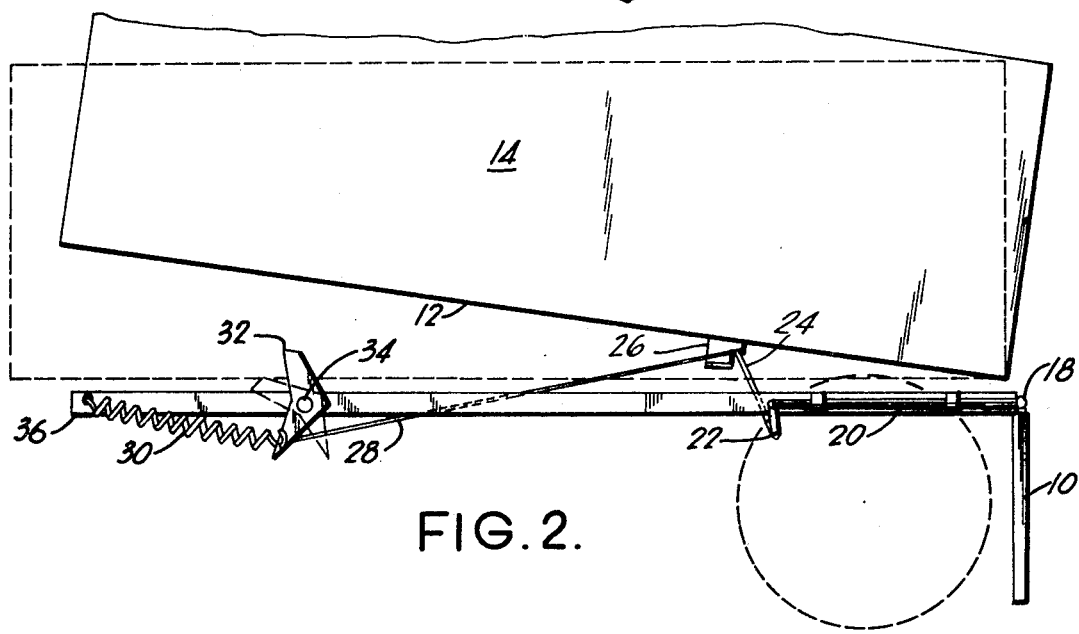
FIG. 2 is a side view of the truck of FIG. 1 showing the mechanism of my invention.
Figure 3:
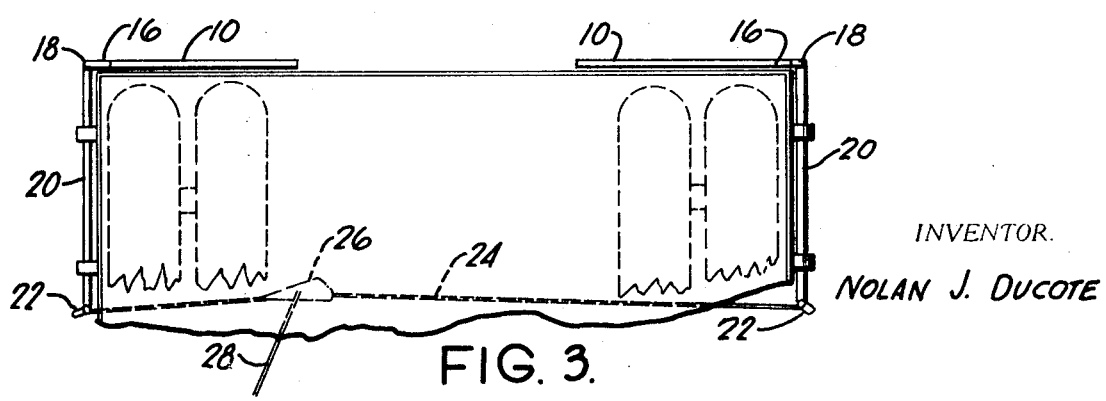
FIG. 3 is a detail top view of my invention.

Referring now to FIGS. 1–3, vertical flexible rectangular mud flaps 10 normally hang downward from the rear of the bed 12 of a dump truck 14 when the bed is horizontal. However when the bed is raised to perhaps a foot, in preparation for dumping, the flaps are swung outward to inverted positions (as shown in phantom in FIG. 1) to be out of the way for dumping.

To this end, each flap is secured to a normally horizontal rod 16 pivotally secured at a point 18 at one end to one end of a second horizontal rod 20 extending at right angles to rod 16 and rotatable about its own axis. The other end of each rod is secured by linkage 22 to a transverse horizontal cable 24.

A coupler 25 secured to the base of bed 12 enables the midpoint of cable 24 to be connected to one end of a longitudinally extending horizontal cable 28 through an aperture in coupler 26. The other end of cable 28 is connected to a free end of coil spring 30. The other end of spring 30 is secured to the frame 36 of the truck.

A vertical V-shaped member 32 rotatable in a vertical plane about its vertex, the vertex being pivotally secured by a horizontal pin 34 to the frame, has one tip engaging the spring. When the bed is horizontal, the tip maintains spring 30 expanded and under tension, providing sufficient slack on the cables to enable the flaps to assume the normal position.

When the bed is raised, the spring contracts, tightening the cables and pulling the flaps into the out-of-the-way position as previously described. The tightening of cable 24 will effect the pivoting of linkages 22 about a generally horizontal axis towards the frame of the truck which will result in the pivoting of rods 20 about their longitudinal axes which, in turn, by virtue of the rigid connection between rods 20 and the associated rods 16, will effect the desired movement of the flaps.

While I have described my invention with particular reference to the drawings, such is not to be considered as limiting its actual scope.

Having thus described this invention, what is asserted as new is:

1. In a dump truck having a bed and means to tilt said bed for dumping and to hold the bed horizontal for hauling, in combination:
   a pair of mud flaps disposed vertically at the rear of the truck;
   first means to pivot said flaps between a first position at which the flaps hang vertically downward and a second position at which the flaps are vertically inverted and pivoted out of the way; and
   second means connected to the first means and responsive to the bed position to cause the first means to place the flaps in the first position when the bed is horizontal and to place the flaps in the second position when the bed is tilted.

2. The combination as set forth in claim 1 wherein the first means includes two rods and a linkage for each flap.

3. The combination as set forth in claim 2 wherein the second means includes cables, a coupler and a spring.

4. The combination as set forth in claim 3 wherein the second means further includes a V-shaped member rotatable about its vertex in a vertical plane.

* * * * *